United States Patent
Melz et al.

(10) Patent No.: US 7,735,901 B2
(45) Date of Patent: Jun. 15, 2010

(54) DEVICE AND METHOD FOR INCREASING OCCUPANT PROTECTION IN A VEHICLE DURING A SIDE-IMPACT

(75) Inventors: Tobias Melz, Darmstadt (DE); Michael Matthias, Darmstadt (DE); Thilo Bein, Darmstadt (DE); Eric Zimmerman, Kassel (DE)

(73) Assignees: Fraunhofer-Gesellschaft zur Forderung der Angewandten Forschung E.V., Munich (DE); Faurecia Innenraum-Systeme GmbH, Hagenbach (DE)

( * ) Notice: Subject to any disclaimer, the term of this patent is extended or adjusted under 35 U.S.C. 154(b) by 464 days.

(21) Appl. No.: 10/570,995

(22) PCT Filed: Aug. 31, 2004

(86) PCT No.: PCT/EP2004/009693

§ 371 (c)(1),
(2), (4) Date: Oct. 2, 2008

(87) PCT Pub. No.: WO2005/025907

PCT Pub. Date: Mar. 24, 2005

(65) Prior Publication Data

US 2009/0021048 A1     Jan. 22, 2009

(30) Foreign Application Priority Data

Sep. 8, 2003     (DE) ................ 103 41 329

(51) Int. Cl.
*B60J 5/04* (2006.01)
(52) U.S. Cl. .................. 296/146.6; 296/187.12
(58) Field of Classification Search ............ 296/187.12, 296/146.6; 49/502
See application file for complete search history.

(56) References Cited

U.S. PATENT DOCUMENTS 4,293,160 A * 10/1981 Lutze et al. ............ 296/187.12

(Continued)

FOREIGN PATENT DOCUMENTS

DE     41 25 299     2/1993

(Continued)

*Primary Examiner*—Jason S Morrow
(74) *Attorney, Agent, or Firm*—Antonelli, Terry, Stout & Kraus, LLP.

(57) ABSTRACT

A device and a method are described for a motor vehicle for protecting passengers during a side impact or during a collision similar to a side impact, in which an energy input acts essentially laterally on a door area of the motor vehicle, a vehicle seat being located on the side of the motor vehicle door facing away from the energy input, having at least one unit stabilizing the motor vehicle door against an energy input acting essentially laterally on the motor vehicle door, which provides at least one lateral impact girder traversing the motor vehicle door internally, which is operationally linked in case of collision to at least two support areas within stable vehicle body areas enclosing the motor vehicle door. The present invention is distinguished in that the side impact girder and/or the support areas within the vehicle body area enclosing the motor vehicle door provide(s) at least one actuator, which is activable through controlled supply of a form of energy independent of the energy input produced by the collision and produces the operational link between the side impact girder and the support areas in a controlled way.

14 Claims, 3 Drawing Sheets

U.S. PATENT DOCUMENTS

| | | | | |
|---|---|---|---|---|
| 5,224,752 A * | 7/1993 | Marshall | | 296/146.1 |
| 5,314,228 A * | 5/1994 | Figge, Sr. | | 296/146.6 |
| 6,601,910 B1 * | 8/2003 | Duggan | | 296/203.03 |
| 6,830,285 B2 * | 12/2004 | Guillez et al. | | 296/146.6 |
| 7,350,851 B2 * | 4/2008 | Barvosa-Carter et al. | | 296/187.02 |
| 7,530,628 B2 * | 5/2009 | Gabler et al. | | 296/187.12 |
| 2006/0028051 A1 * | 2/2006 | Brei et al. | | 296/187.04 |
| 2006/0125291 A1 * | 6/2006 | Buravalla et al. | | 296/204 |
| 2008/0133090 A1 * | 6/2008 | Browne et al. | | 701/49 |
| 2008/0217941 A1 * | 9/2008 | Chernoff et al. | | 296/1.02 |
| 2009/0108607 A1 * | 4/2009 | Browne et al. | | 296/1.02 |

FOREIGN PATENT DOCUMENTS

| | | |
|---|---|---|
| DE | 196 33 637 | 2/1998 |
| DE | 198 28 444 | 12/1999 |

* cited by examiner

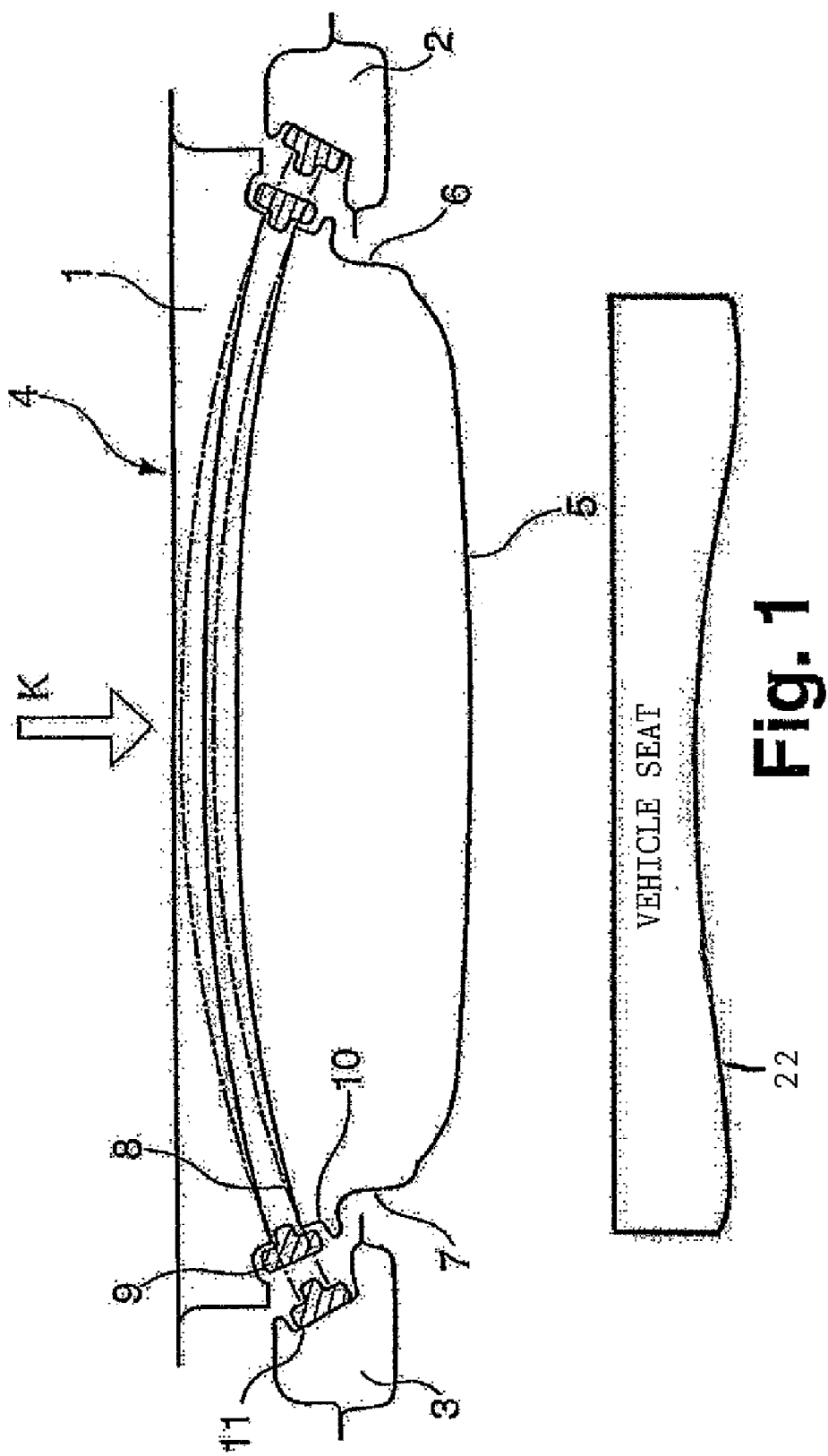

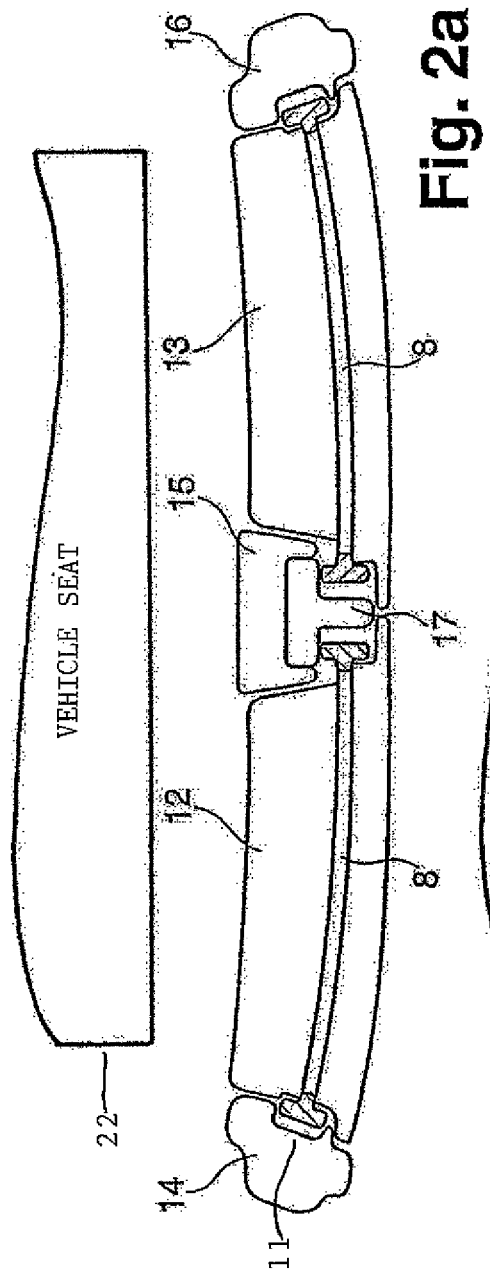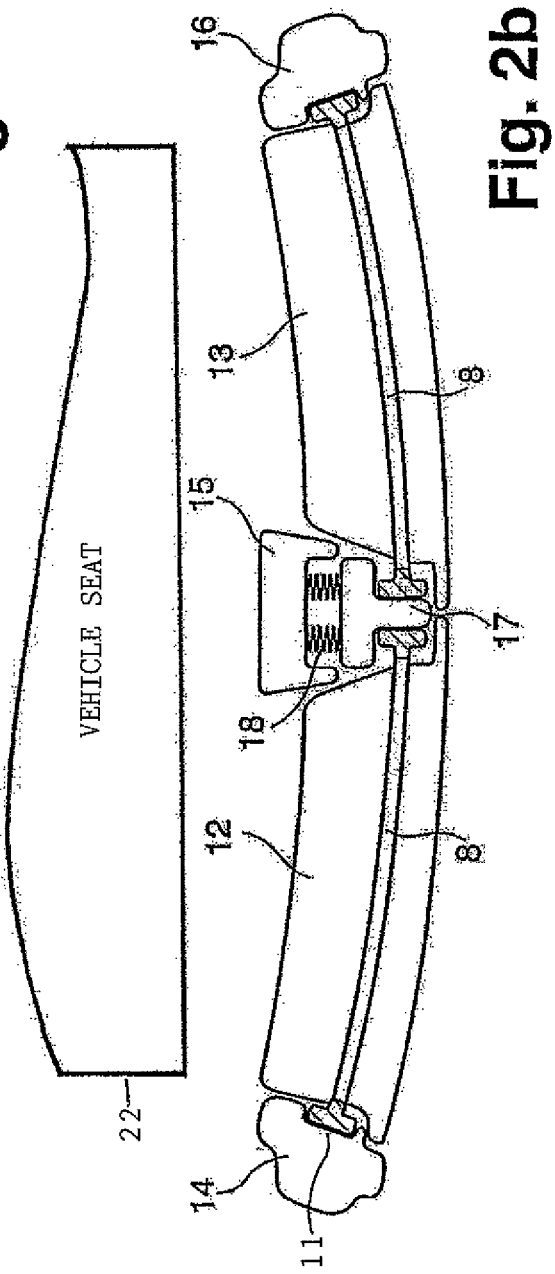

DEVICE AND METHOD FOR INCREASING OCCUPANT PROTECTION IN A VEHICLE DURING A SIDE-IMPACT

BACKGROUND OF THE INVENTION

1. Field of the Invention

The present invention relates to a device for protecting the passengers of a motor vehicle during a side impact or during a collision similar to a side impact, in which an energy input acts essentially laterally on a door area of the motor vehicle, having at least one girder stabilizing the motor vehicle door against an energy input acting essentially laterally on the motor vehicle door, which provides at least one side impact girder lying in the motor vehicle door and traversing the latter, which is operationally linked to at least two support areas within stable vehicle body areas enclosing the motor vehicle door in case of collision. In addition, the invention relates to a method for increasing the passenger protection in a vehicle during a side impact situation is described.

2. Description of the Prior Art

Passenger protection in motor vehicles is one of the main objects in the construction and development of motor vehicles. A separate development goal is to provide pronounced crumple zones in the front and rear areas, which are capable of largely safely protecting the passenger interior during front and rear collisions. In contrast, during lateral collisions, passenger protection causes larger problems because of the smaller deformation paths available and the lesser absorption capability of the lateral structure of a motor vehicle.

Known achievements for reducing the danger to passengers arising during side collisions of motor vehicles provide stiffening of the motor vehicle door. Thus, for example, profiles integrated in the motor vehicle door, which have a high rigidity and/or a high energy absorption capability in the vehicle transverse direction, are known. For example, a vehicle door having side impact protection, in whose door frame curved holding rods are provided, which are twisted and deformed under tensile strain similarly to the action of a net, is disclosed in DE 196 33 637 A1.

Stiffening the side doors by providing corresponding longitudinal girders is insufficient for protecting the passengers in more serious cases of collision, however, since in the event of an external force acting on the side door, this door is pressed through the door cutout of the vehicle body, so that the survival space of the passengers is drastically constricted and the survival chances are reduced in the same way.

In addition, the prior art includes an array of measures which are capable of transmitting forces acting on the side door to the vehicle body. For example, these measures include appropriately large overlap between door and door cutout or through bolts projecting out of the edge of the door, which engage in case of collision in reinforced recesses of the door cutout of the motor vehicle body. Thus, a reinforcement unit is provided for a motor vehicle door, which essentially comprises an outwardly arched girder, whose end sections penetrate into appropriately stable recesses within the door frame in the event of deformation of the girder into a stretched shape due to an external impact, which is disclosed in DE AS 22 15 674. The girder preferably comprises profiled sheet steel, which is brought into the appropriate form through rolling.

To avoid the increase of the intrinsic weight of the motor vehicle caused by the above measures, a reinforcement unit provided for a motor vehicle door, which comprises a curved, molded reinforcement unit manufactured from fiber-reinforced composite material for reasons of weight reduction, is described in DE 41 25 299 C2. In this case as well, the reinforcement device is completely inside the door, whose end areas only project on both sides out of the door in case of collision because of the accompanying deformation of the reinforcement girder, which are in turn operationally linked to stable support flanks in the door frame of the motor vehicle body.

SUMMARY OF THE INVENTION

Proceeding from the prior art described above, the present invention is based on a security system which optimizes the passenger protection, which is capable of offering increased passenger protection in case of a side impact. In particular, the security system is improved in such a way that the deformation energy acting laterally on a motor vehicle door in case of collision is conducted away in a targeted and secure way out of the area of the motor vehicle door.

Furthermore, a corresponding method for increasing the passenger protection in a motor vehicle during a side impact situation is specified, in which the danger of injury of persons may be significantly reduced in relation to known achievements of the object.

The device according to the present invention is distinguished in that the side impact girder and/or the support areas within the vehicle body areas surrounding the motor vehicle door provide(s) at least one actuator, which is activatable through controlled supply of a form of energy independent of the energy input originating from the collision and produces the operational link between the side impact girder and the support areas in a controlled way.

The achievements of the prior art up to this point use the energy of the collision itself to produce an operational link between components of the motor vehicle door, and/or the side impact girder traversing the motor vehicle door, which is made of fiber-reinforced plastic, according to DE 41 25 299 C2, and areas of the vehicle body areas immediately surrounding the motor vehicle door, through which joint connections which arise largely uncontrolled arise. In contrast, according to the present invention, the side impact girder is operationally linked to corresponding support areas within stable vehicle body areas, preferably within the A, B, and/or C columns, driven by suitable actuators, even before the collision event, this operational link having an exactly predefined constructive embodiment and a defined strength. The latter property is particularly relevant for a numeric computability usable in the construction phase and for a corresponding theoretical optimization process for the crash resistance of motor vehicle doors.

In order to produce the operational link between the components in a timely manner before the actual energy input caused by the collision, corresponding actuators are provided, which work together with the side impact girder and are connected to an additionally provided energy source for activation. In principle, known actuator systems are suitable for this purpose, which produce a controlled operational link between the above components. A removable solid lock is especially advantageously produced between the ends of the side impact girder and the particular support areas within the A, B, and/or C columns, which is based on a formfitting connection. Final control elements driven by motors may be used suitably as actuators, as well as piston-cylinder units, which are based on a hydraulic, pneumatic, or pyrotechnic operational principles.

In the simplest case, final control elements ensure lengthening of the side impact girder, through which this projects beyond the motor vehicle door sides on both sides and has its ends engage in counter-contoured recesses within the support areas. Using suitable final control elements within the support areas, the ends of the side impact girder may preferably be locked by a bolt lock connection within the terminal areas.

In an especially advantageous refinement of the present invention, intelligent structures, which provide the targeted use of conversion materials, ensure the formation, provided in case of collision, of a controlled joint connection between the side impact girder and the support areas provided in the stable vehicle body areas.

In contrast to the prior art explained above, according to which the unit stabilizing the motor vehicle door comprises a material or a material structure, which has a permanently predefined strength resulting from the shaping and material selection of the stabilizing unit, the use of conversion materials in the implementation of the side impact girder and/or the support areas in accordance with the invention provides the possibility of producing a shape change of the particular components in the course of intrinsic structural changes through external activation, which occurs without any final control elements or multicomponent systems.

Through the targeted use of intelligent structures comprising conversion materials, which will be explained in detail in the following, it is possible to set and control the stability and the strength behavior of structures of this type in a targeted way, shape and/or strength changes caused through corresponding activation and deactivation preferably being able to be reformed reversibly, depending on the selection and use of specific conversion materials (an exception is the SMA one-way effect). The latter property is used advantageously, for example, for locking and unlocking of join partners operationally linked to one another, which will also be noted individually and the following.

For this purpose, an exemplary embodiment has at least one side impact girder, implemented as oblong and/or like an extruded profile, within the motor vehicle door, in such a way that the side impact girder traverses the vehicle door horizontally. The diametrically opposite ends of the side impact girder preferably terminate flush with the particular motor vehicle door side wall, so that the side impact girder is integrated completely in the door and is not capable of impairing the normal operating comfort of the door (if necessary, a slight projection may be advisable and not obstruct the door operation, however).

The side impact girder implemented like an extruded profile is preferably manufactured completely or only in sections from an activatable conversion material, which experiences a spontaneous structural change through the application of thermal energy and/or an electrical voltage in such a way that the shape and size of the side impact girder section manufactured from the particular material is capable of changing in a controlled way. If the converter element used is a shape memory metal and/or a shape memory alloy (for example, NiTi), for example, in the event of suitable electrothermal activation of the material, a spontaneous volume increase of the side impact girder appears, which is controllable as a function of the electrical and/or thermal energy supply, through which the side impact girder projects laterally beyond the motor vehicle door through lengthening. The ends of the side impact girder, which project beyond the motor vehicle door on both sides, each in turn project into stiffer structures within the vehicle body immediately surrounding the door, into which the main load of the force input is conducted during the side impact.

Especially advantageously, the more stable structures within the vehicle body provide support areas tailored to the end sections of the side impact girder, so that the join between the ends of the side impact girder and the support areas occurs in a defined way in order to avoid arbitrarily arising clamping or shear forces. The support areas and the ends of the side impact girder are preferably implemented in such a way that both join partners are each operationally linked to one another via a locking mechanism, which is capable of ensuring a solid, if advantageously removably solid, joint connection. By providing a locking mechanism, which may suitably be implemented from conversion materials itself, in order to trigger the locking procedure through corresponding activation of the particular conversion material, the joint connection resulting in a controlled way in case of collision, which has a strength and a force transmission property that may be exactly determined beforehand, is capable of absorbing the side impact energy in a controlled way and dissipating it out of the door area in a targeted way.

Depending on the type and selection of the conversion materials used in the support areas and the end areas of the side impact girder, it is possible to reproduce the open starting status of the join partners through activatable reversibly acting structural changes and allow opening and/or loosening of the joint connection and/or lock in this way. If no further material deformations caused by the side impact have occurred between door and vehicle body area, which prevent unobstructed loosening of the door from the remaining vehicle body, the passenger recovery after cases of collision of this type is made significantly easier in relation to the prior art using the measures described above.

In addition to the variation described above of providing at least one horizontal side impact girder, which traverses the motor vehicle door and is implemented like an extruded profile, and which is preferably, depending on the vehicle type, able to be supported between A and B columns or between A and C columns or between B and C columns in corresponding vehicle body areas in case of collision, it is also conceivable and possible to provide at least one correspondingly implemented side impact girder in vertical arrangement within the motor vehicle door, which finds stable anchoring points in the roof and floor areas in case of collision through corresponding longitudinal spreading.

A further advantageous implementation of the side impact girder lengthening in case of collision relates to providing sacrificial structures, which at least partially absorb the impact energy in the course of the collision, in the area of the support areas within the stable vehicle body surrounding the door, in which the ends of the lengthened side impact girder engage and in which the impact energy may be dissipated in a targeted way in case of collision.

Alternatively to or in combination with sacrificial structures of this type, actively activatable or passively damping components may additionally be provided within the support areas, in order to provide an additional contribution to the dissipation of the impact energy in case of collision. The implementation of actively activatable components of this type for the targeted control of the course of the energy dissipation is also possible with the aid of suitable selected conversion materials, which are based on the shape memory effect, the piezo effect, or on magnetostrictive effects.

In addition to the concept on which the present invention is based, of a targeted, controlled support of the lengthening side impact girder within stable side areas of the vehicle body, it is additionally especially advantageous to also design the side impact girder in such a way that the girder assumes a curvature facing toward the energy input along its design implemented like an extruded profile, through which an additional deformation pathway is provided and, moreover, splitting of the load vector acting due to the energy input on the curved carrier element into transverse and longitudinal forces is made possible. An actively controllable curvature of the side impact girder may be implemented by manufacturing the side impact girder completely or partially from a conversion material, which itself has a pre-curvature and undergoes an amplification of the curved shape along its longitudinal extension upon corresponding activation. The pre-curved, oblong side impact girder is integrated inside the door in such a way that the convex side of the side impact girder faces toward the door outer wall and provides an additional crumple zone in the event of a possible side impact by increasing the curvature. With the use of side impact girders, which are made of conversion materials and are implemented as being pre-curved, it is thus conceivable, for side impact girders to be mounted in the way described above within a motor vehicle door, the convex side of the pre-curved side impact girder runs directly against the inside of the outer sheet-metal defining the motor vehicle door. In case of collision, the side impact girder is activated in such a way that the radius of curvature of the side impact girder is reduced and, simultaneously, the convex side of the side impact girder projects beyond the outwardly facing door plate from the inside, in order to provide additional deformation space and/or an additional lateral crumple zone.

As an alternative to implementing the side impact girder completely from a conversion material capable of the shape change described above, such as shape memory metal, it is also possible to produce the increase in curvature of the side impact girder provided in pre-curved form within the motor vehicle door through active compression and/or lengthening via both ends of the side impact girder. In a consequent refinement of this alternative, an embodiment with the side impact girder traversing the motor vehicle door not including a conversion material itself is possible with rather stable support areas within the vehicle body areas directly adjoining motor vehicle door, which are operationally linked to the side impact girder in case of a collision, which have intelligent structures activatable in a controlled way so that they each penetrate laterally into the door area in case of collision through corresponding shape change and are operationally linked to the side impact girder provided inside the motor vehicle door via appropriately implemented joint connections. The side impact girder experiences a desired curvature in the course of a targeted compression, as described above. Of course, combined embodiments are also possible, in which conversion materials are provided in the support areas and the side impact girder comprises a conversion material. The compression and/or lengthening may also be implemented through conventional actuators, these probably not being advisable for crash applications because of limited rigidity.

The present invention is, in principle, in addition to the preferred selection and use of conversion materials comprising solids, such as shape memory metals and alloys, piezo metals and ceramics, magnetostrictive alloys, also includes viscous or liquid conversion materials such as piezo polymers, or electrorheological or magnetorheological fluids, which are integrated into suitable containers in order to be able to absorb pressure and possibly tensile forces suitably. Thus, materials of this type are capable of changing their structural-mechanical properties in a targeted way through targeted generation of internal forces, through which, in addition to the property of shape change already cited, targeted adjustment of the structural rigidity and/or the damping characteristic is also possible, for example.

The targeted activation of above-mentioned conversion materials occurs in different ways depending on the selection of the materials used. For example, shape memory metals are to be activated by supplying thermal or electrothermal energy, that is, local heating connected to electrical activation in the course of the resistance heat losses arising within fractions of seconds, through which the materials experience a desired shape and/or structural change. In the same way, materials based on piezo effects may be activated into corresponding shape changes. A further possibility for targeted activation of materials based on magnetostrictive effects provides the generation of magnetic fields, which may also be generated quickly with the aid of suitable electromagnet arrangements.

At least one triggering signal is required for the activation of the intelligent structures described above, which is obtained with the aid of structural-mechanical sensors installed in the vehicle, which register an energy input acting on the motor vehicle in the course of a side impact. The measures provided for passenger protection are activated in this case with a slight time delay after the energy input in the motor vehicle. In an improved embodiment, however, a chronologically immediately imminent side impact situation is detected using suitable sensors attached to the motor vehicle. This may be performed using suitably attached, contactless object distance sensors, i.e., proximity sensors, which are based in a known way on ultrasonic, infrared, or induction technology. With the aid of proximity sensors of this type, it is possible to activate the protective mechanisms described above to increase the lateral stability of a motor vehicle door immediately before the actual force input, caused by a side impact, so that the maximum stability and increased crumple zone generation is already produced before the actual force input. Suitable sensors are known to those skilled in the art and therefore do not require further explanation at this point.

In addition to the use described above of intelligent structures having corresponding activation, it is also possible to operate conversion materials passively, that is, without activation. It has been shown that by using a side impact girder manufactured from shape memory metal, for example, which horizontally traverses a motor vehicle door internally, an adaptation to the energy input during a side impact is made possible through setting of the rigidity value, which is possible through manufacturing or material technology. For this purpose, for example, shape memory metals have superelasticity as well as structural damping based on the material hysteresis, which are especially used as elements for absorbing deformation energy with suitable setting. Thus, conversion materials preferably comprising solids, above all the shape memory materials as described, are capable of experiencing a specific structural change as a function of the energy input acting on the particular materials, which finally results in a material rigidity dependent on the force input. In addition, it is also possible to set the behavior of the material rigidity through a targeted supply of the material with electrical energy, in addition to the energy input noted. These possibilities finally result in the recognition that materials of this type are extremely advantageously usable in the area of the motor vehicle for absorbing deformation energy.

The method according to the present invention for increasing the passenger protection in a vehicle during a side impact is based on this recognition, in which the side impact girder and/or the support areas within the vehicle body areas surrounding the motor vehicle door are activatable by controlled supply of a form of energy independent of the energy input originating due to the collision, so that an operational link is produced between the side impact girder and the support areas in a controlled way.

BRIEF DESCRIPTION OF THE DRAWINGS

The present invention is described for exemplary purposes in the following, without restriction of the present invention, on the basis of exemplary embodiments with reference to the drawing.

FIG. 1 shows a schematic longitudinal section through a motor vehicle door, located between the A and B columns of a motor vehicle, having a stabilizing unit implemented according to the present invention;

FIGS. 2a, b show alternative embodiments for motor vehicles having A, B, and C columns.

DETAILED DESCRIPTION OF THE INVENTION

Figure 3B:
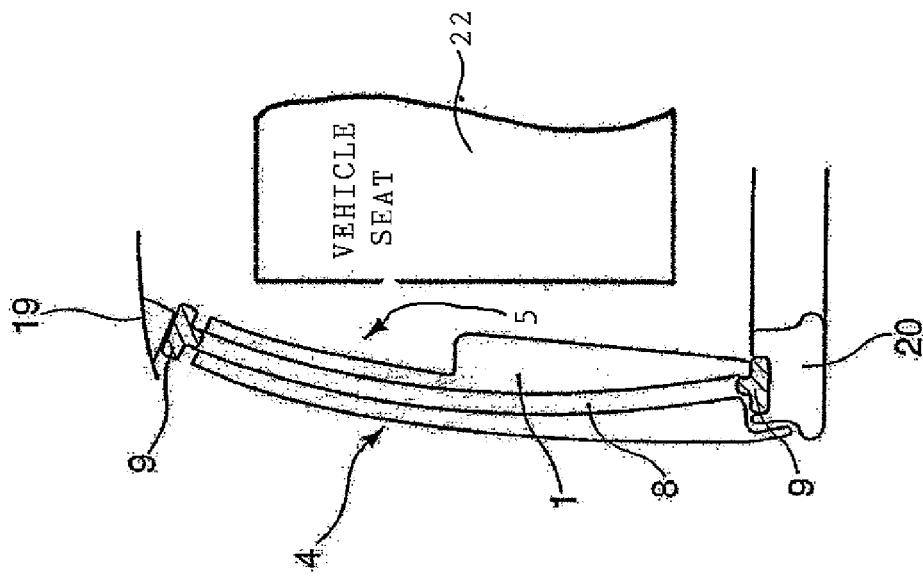
FIG. 3 shows a schematic side view of a motor vehicle door having a vertically running stabilizing unit.

FIG. 1 shows a schematic longitudinal section through a motor vehicle door 1, which is positioned between the A column 2 and the B column 3 of a motor vehicle (not shown further). The motor vehicle door 1 is defined laterally on the outside in a way known per se by an outer plate 4, in relation to the interior by an inner plate 5, and in relation to the A column 2 and B column 3 by the door side walls 6 and 7, respectively. A vehicle seat 22 is located inboard of and on an interior side of the motor vehicle door 1 facing away from the energy input K. A stabilizing unit in the form of a side impact girder 8 is provided in the interior of the motor vehicle door 1, which traverses the motor vehicle door 1 in horizontal orientation in the way indicated in FIG. 1 (see the solid line). The side impact girder 8 is made of a conversion material, preferably of a shape memory metal alloy (NiTi) and has a shape curved convexly toward the outer plate 4. The two ends of the side impact girder 8, which is implemented like in extruded profile, and which have a round or polygonal cross-section, terminate flush with the door side edges 6 and 7. In addition, a support element 9 is provided on each of the two ends of the side impact girder 8, which is placed in a recess 10 incorporated into the door side walls 6, 7, in such way that the door function, that is, opening and closing, is not impaired.

At least one sensor 21 and 21' (illustrated in FIG. 3a) is installed in the vehicle for generating a triggering signal upon the at least one sensor sensing either an input of energy K from a collision with the vehicle door or an imminent collision with the vehicle door. An energy source 23 (illustrated in FIG. 3a), as described below, is activated by the triggering signal to a thermal or electro-thermal energy to the conversion material to cause the change in shape thereof as described herein.

If a chronologically immediately imminent side impact situation occurs, which is detectable with the aid of suitably conceived, well known contactless sensors 21 and 21, the side impact girder 8 made of a conversion material is activated through supply of electrical energy in such way that, based on a structural change, the side impact girder 8 undergoes a form change, which results both in lengthening of the side impact girder 8 and also in an increase of the pre-curvature. This case is indicated in FIG. 1 by the dot-dash line. Because of the lengthening of the side impact girder 8, the support elements 9 achieve a close pressure contact to the particular A and B columns 2, 3, each of which provides a suitable support surface for the support elements 9. The A and B columns 2, 3 represent stable vehicle body areas, between which the lengthened side impact girder 8 experiences a mechanically stable support via the particular support elements 9. In addition, the support of the side impact girder 8 on both sides on the A and B columns 2, 3 causes an increase of the curvature of the side impact girder 8 in the direction of the outer plate 4 of the motor vehicle door 1, through which an additional crumple zone in relation to a force input K acting laterally on the motor vehicle door 1 is formed.

Finally, the shape change of the side impact girder 8, which is activatable in a targeted way, results in an increase of the material rigidity of the conversion material, through which the side impact girder 8 is capable of effectively dissipating the force input K acting on the motor vehicle door 1 away from the door area into the stably implemented vehicle body areas of the A and B columns. Simultaneously, the structural change causes a change of the material damping.

Based on the exemplary embodiment shown in FIG. 1, FIGS. 2a and b show the interaction of two stabilizing units which are provided along a vehicle side in the front and rear doors. Thus, FIG. 2a shows the starting situation, while in contrast FIG. 2b shows the activated status directly before a collision.

FIGS. 2a and b each show two doors 12 and 13, which are positioned between A column 14 and B column 15 or between B column 15 and C column 16, respectively. Comparably to the exemplary embodiment shown in FIG. 1, the doors 12 and 13 have corresponding side impact girders 8 implemented as stabilizing units. The B column 15 is implemented in the exemplary embodiment shown in FIGS. 2a and b in such way that it provides a movable component 17 toward the direction of the vehicle outer wall 4. The function of the movable component 17 is obvious in the situation shown in FIG. 2b. It is assumed that in case of collision, both side impact girders 8 are activatable and assume a lengthened form, through which they are operationally linked solidly to the A column 14 and B column 15 or to the B column 15 and the C column 16, respectively. The side impact girders 8 are supported via their particular support elements 9 on both sides of the sides of the B column 15 in such way that they do not press directly against the B column 15, but rather on both sides against the movable components 17, as shown in FIG. 2b. In addition, damping elements 18 which may be spread away from the B column 15 in case of collision ensure that the movable components 17 are distanced in the direction of the motor vehicle door outside 4, through which an additional, a further crumple zone in relation to the vehicle interior is provided. The damping elements 18 are preferably manufactured, like the side impact girders 8, from a conversion material, comprising a shape memory material, for example, which is activatable in a targeted way in case of collision in the way described.

Of course, the individual side impact girders 8 shown in FIG. 2 additionally contribute to increasing the crumple zone because of their curvature change, without having to discuss this again in detail at this point.

Figure 3A:
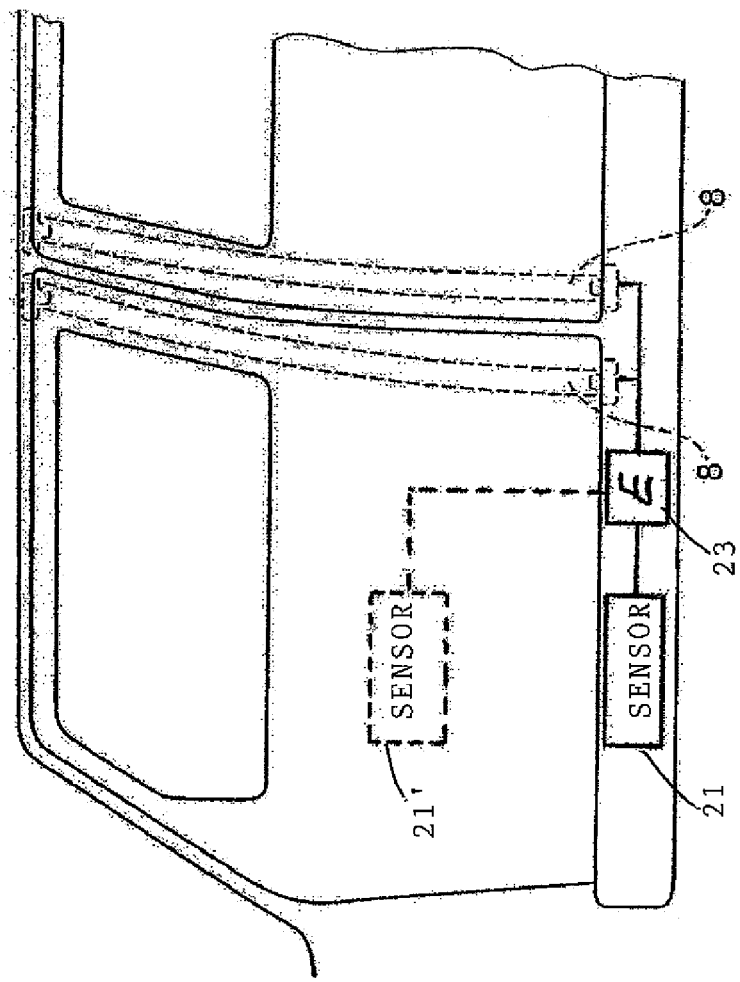

FIGS. 3a, b show an exemplary embodiment which provides a side impact girder 8 positioned vertically inside the motor vehicle door 1, whose support elements 9 are operationally linked in case of collision to stable vehicle body areas in the roof and threshold areas 19, 20. Sensors 21 or 21', which are respectively a proximity sensor for sensing an imminent impact K, which are well known and a structural-mechanical sensor for sensing the active impact K which also is well known, produce the aforementioned triggering signal. The structural-mechanical sensor 21' is shown with a dotted line to indicate it as an alternative to the proximity sensor 21 which generates the triggering signal in a faster manner. The triggering signal activates the energy supply 23 and labelled therein as "E" which may be a thermal or an electro-thermal energy source as described above. FIG. 3b shows a cross-section through the attachment of the side impact girder 8 inside the door 1, which, similarly to the description of the figures, provides an outer door region 4 and an inner door region 5. In the case of collision, the support elements 9 provided on both ends of the side impact girder 8 are operationally linked to the roof construction 19 and/or to the threshold area 20.

Of course, arbitrary combinations of the vertically running side impact girder arrangement shown in FIG. 3 and the horizontally oriented side impact girder arrangement shown in FIGS. 1 and 2 within a single vehicle door are possible.

LIST OF REFERENCE NUMBERS 1 motor vehicle door
2 A column
3 B column
4 door outside
5 door inside
6, 7 door side wall areas
8 side impact girder
9 support element
10 recess
11 recess
12, 13 motor vehicle door
14 A column
15 B column
16 C column
17 movable components
18 damping element
19 roof vehicle body area
20 threshold vehicle body area
21 proximity sensor
21' structural-mechanical sensor
22 vehicle seat
23 energy source

The invention claimed is:

1. A device in a motor vehicle for protecting passengers during a collision comprising:
an energy source;
a door of the motor vehicle;
a vehicle seat located on an inboard side of the door;
at least one sensor installed in the vehicle for triggering, upon the occurrence of the at least one sensor sensing either an input of energy from a collision with the door or an imminent collision with the door, application of energy from the energy source;
at least one unit for stabilizing the door against the energy input from the collision with the door including at least one impact girder internally traversing the door which is linked with the door upon a collision to support areas within stable vehicle body areas surrounding the door and wherein;
the at least one impact girder and/or support areas at least partially comprise a conversion material, the conversion material undergoing a shape change in response to the application of energy from the energy source, independent of the energy input from the collision, and producing an operational link upon the collision between the at least one impact girder and the support areas.

2. The device according to claim 1, wherein:
the operational link is removable and comprises a solid joint connection along at least one predefined joint face.

3. The device according to claim 1, wherein:
the operational link is a formfitting connection comprising an activable locking and unlocking mechanism.

4. The device according to claim 1, wherein:
the conversion material comprises at least one of piezo ceramic, piezo polymer, electrostrictive ceramic, electrorheological fluid, polymer gel, magnetorheological fluid, memory shape alloy or memory shape polymer.

5. The device according to claim 1 wherein:
a part of the at least one impact girder comprises the conversion material which undergoes a shape change in response to the application of energy from the energy source thereto before and during the collision so that the at least one impact girder projects beyond sides of the door and enters into a mechanical connection with the support areas within the stable vehicle body areas.

6. The device according to claim 1 wherein:
the stable vehicle body areas are columns of the motor vehicle; and
the at least one impact girder traverses the vehicle door at least in a horizontal direction.

7. The device according to claim 1 wherein:
the stable vehicle body areas are roof and floor areas of the motor vehicle; and
the at least one impact girder traverses the door at least in a vertical direction.

8. The device according to claim 1, wherein the at least one impact girder comprises an oblong profile.

9. The device according to claim 8, wherein:
the oblong profile at least partially comprises the conversion material comprising one of a shape memory metal or alloy.

10. The device according to claim 8, wherein:
the oblong profile comprises conversion material at diametrically opposite end areas of the oblong profile.

11. The device according to claim 1 wherein:
the at least one impact girder comprises a longitudinal extension with a first radius of curvature facing toward the energy input caused by the collision; and
the at least one impact girder undergoes a shape change in response to the application of energy from the energy source so that the at least one lateral impact girder assumes a curvature with a second radius of curvature which is smaller than the first radius of curvature and which is settable in a controlled way.

12. The device according to claim 11 wherein:
the at least one impact girder assumes a spatial position projecting in a direction from which the energy input acts on the door to provide an additional crumple zone.

13. The device according to claim 11 comprising:
actuators for causing a change in shape of the at least one impact girder by controlled compression of the at least one impact girder upon engagement on both sides of ends of the impact girder by the actuators being provided in the stable support areas; and/or
a change in shape of the impact girder is produced during an intrinsic structural change and is activable in a controlled way with the at least one impact girder comprising the conversion material.

14. The device according to claim 1 wherein:
the support areas include an actuator, the actuator being operationally linked to the at least one impact girder for producing a frictional and/or formfitting joint connection with the at least one impact girder.

* * * * *